US009529332B2

(12) United States Patent
Perrinjaquet

(10) Patent No.: US 9,529,332 B2
(45) Date of Patent: Dec. 27, 2016

(54) WATCH SUPPORT SUITABLE FOR USE WITH A WATCH WINDER

(71) Applicant: Swiss Industrial Consulting & Technology SA, Morges (CH)

(72) Inventor: Nicolas Perrinjaquet, Morges (CH)

(73) Assignee: Swiss Industrial Consulting & Technology SA, Morges (CH)

( * ) Notice: Subject to any disclaimer, the term of this patent is extended or adjusted under 35 U.S.C. 154(b) by 0 days.

(21) Appl. No.: 14/424,259

(22) PCT Filed: Sep. 2, 2013

(86) PCT No.: PCT/EP2013/068066
§ 371 (c)(1),
(2) Date: Feb. 26, 2015

(87) PCT Pub. No.: WO2014/033292
PCT Pub. Date: Mar. 6, 2014

(65) Prior Publication Data
US 2015/0227114 A1 Aug. 13, 2015

(30) Foreign Application Priority Data
Aug. 31, 2012 (GB) .................................. 1215511.5

(51) Int. Cl.
*G04D 1/00* (2006.01)
*G04D 7/00* (2006.01)
(Continued)

(52) U.S. Cl.
CPC .................. *G04D 1/00* (2013.01); *A47F 7/022* (2013.01); *F16M 11/04* (2013.01); *F16M 11/28* (2013.01); *G04D 7/009* (2013.01)

(58) Field of Classification Search
CPC ........ G04D 1/00; G04D 7/009; G04D 1/0078; A47F 7/022; A47F 7/02; B65D 85/40; G04B 5/00
(Continued)

(56) References Cited

U.S. PATENT DOCUMENTS 2,178,296 A * 10/1939 Argo ........................ A44C 5/14
81/6
2,233,559 A * 3/1941 Shields ..................... A47F 7/02
312/119
(Continued)

FOREIGN PATENT DOCUMENTS

AT 9 886 5/2008
CH 561 040 4/1975
(Continued)

*Primary Examiner* — Jonathan Liu
*Assistant Examiner* — Muhammad Ijaz
(74) *Attorney, Agent, or Firm* — Cesari and McKenna LLP

(57) ABSTRACT

A watch support (1, 30) comprises an upper part (2) operatively connected to a lower part (3) for movement between a contracted orientation and an expanded orientation, and biasing means for biasing the upper and lower parts into the expanded orientation. The upper part (2) comprises a pair of adjustable wings (6, 7) that are moveable relative to the upper part between an extended position and a folded position, wherein each wing (6, 7) is operatively connected to the lower part (3) such that movement of the two parts (2, 3) into a contracted orientation effects movement of the wings (6, 7) into a folded position and movement of the two parts (2, 3) into an expanded orientation effects movement of the wings (6, 7) into an extended position.

6 Claims, 7 Drawing Sheets

(51) Int. Cl.
*F16M 11/28* (2006.01)
*F16M 11/04* (2006.01)
*A47F 7/02* (2006.01)

(58) Field of Classification Search
USPC ........ 248/114–116, 442; 206/301, 45.2, 560, 206/6.1, 754; 368/278, 286, 316, 317
See application file for complete search history.

(56) References Cited

U.S. PATENT DOCUMENTS

| | | | | |
|---|---|---|---|---|
| 3,444,685 | A * | 5/1969 | Juillerat | G04B 37/0041 368/276 |
| 4,293,943 | A | 10/1981 | Avery et al. | |
| 5,181,608 | A * | 1/1993 | Herzog | A45C 11/12 206/301 |
| D380,914 | S * | 7/1997 | Dostie | D6/682.2 |
| 5,799,911 | A * | 9/1998 | Dostie | A47F 7/022 206/301 |
| 6,254,270 | B1 * | 7/2001 | Agnoff | G04D 7/009 368/206 |
| 6,264,148 | B1 * | 7/2001 | Chandler | A47F 7/022 206/301 |
| 6,543,929 | B1 * | 4/2003 | Agnoff | G04D 7/009 368/206 |
| 6,671,920 | B2 * | 1/2004 | Pearlman | A45D 40/023 132/308 |
| 7,192,183 | B2 * | 3/2007 | Chan | G04B 37/0445 368/276 |
| 7,228,963 | B1 * | 6/2007 | Feibelman | A47F 7/022 206/1.5 |
| 7,452,150 | B2 * | 11/2008 | Chan | B43K 5/005 401/108 |
| 2001/0045369 | A1 * | 11/2001 | Pearlman | A45D 40/023 206/362.2 |
| 2002/0092781 | A1 | 7/2002 | Au et al. | |
| 2003/0071176 | A1 * | 4/2003 | Kirshner | A47F 7/022 248/116 |
| 2007/0159929 | A1 * | 7/2007 | Louie | G04B 3/006 368/206 |
| 2011/0170380 | A1 * | 7/2011 | Moroni | G04B 3/006 368/206 |
| 2011/0260589 | A1 * | 10/2011 | Soltis, Jr. | A47F 7/022 312/237 |
| 2012/0211626 | A1 * | 8/2012 | Zhu | A45F 5/00 248/316.1 |
| 2012/0269045 | A1 * | 10/2012 | Balter | G04D 7/009 368/206 |
| 2015/0117164 | A1 * | 4/2015 | Ng | G04D 7/009 368/208 |
| 2016/0004223 | A1 * | 1/2016 | Willemin | G04C 1/02 368/207 |

FOREIGN PATENT DOCUMENTS

| | | |
|---|---|---|
| CH | 699 481 | 3/2010 |
| DE | 10 2006 034725 | 3/2007 |
| GB | 854 352 | 11/1960 |

* cited by examiner

PRIOR ART

_(1)_

WATCH SUPPORT SUITABLE FOR USE WITH A WATCH WINDER

CROSS REFERENCE TO RELATED APPLICATIONS

This application is the National Stage of International Application No. PCT/EP2013/068066, filed on Sep. 2, 2013, which claims the benefit of Great Britain Application No. 1215511.5, filed on Aug. 31, 2012. The contents of both applications are hereby incorporated by reference in their entirety.

TECHNICAL FIELD

The invention relates to a support for a wrist watch of the type employed in watch winders, also known as remontoires, and watch display cases. The invention also relates to a watch winder comprising a watch support.

BACKGROUND TO THE INVENTION

Watch winders, also known in the trade as remontoires, are employed to rewind automatic wrist watches. The watch winder comprises a body, a watch support adapted to hold the watch, and an electromechanical mechanism to rotate the watch holder relative to the body to cause re-winding of the watch held in place on the watch winder. Examples of watch winders are described on the SWISSKUBIK website.

Watch supports for watch winders generally comprise an upper part operatively connected to a lower part for movement between a contracted orientation and an expanded orientation, and biasing means for biasing the upper and lower parts into the expanded orientation. An example of a known watch support is shown in FIGS. 11A and 11B. In a resting state, the support is biased into an expanded orientation (FIG. 11A). In use, the user compresses the two parts into the contracted orientation, where the support is small enough to be placed inside a watch strap/bracelet, and once inside, the support is allowed to assume the expanded orientation where it grips and hold the watch (FIG. 11B). A problem with known watch supports of the afore-mentioned type is that they cannot be used with a broad range of watch sizes. Thus, a watch support designed for use with an adult's watch will not be suitable for use with a child's watch, as it will not contract sufficiently to fit inside a watch strap for a child's watch. Similarly, watch supports designed for a child's watch will not expand sufficiently to grip an adult's watch.

It is an object of the invention to overcome at least one of the above-referenced problems.

STATEMENTS OF INVENTION

The Applicant has addressed the problems of known watch supports by providing a pair of wings on the upper part that are moveable relative to the upper part between an extended disposition and a folded disposition in response to movement of the upper and lower parts between a contracted orientation and an expanded orientation. This provides a watch support that can expand and contract along two axes, or in two directions, which provides a greater range of expansion and contraction compared to known watch supports that are adjustable along only a single axis. Further, whereas known watch supports bear against the watch at primarily two locations (i.e. against the body of the watch and a point on the strap opposite the body of the watch), the watch support of the invention bears against the watch at four positions, namely the bearing surfaces on the upper and lower parts and of each wing. This enables the watch support to grip the watch more securely compared to known watch supports. In addition, the watch support may be adjusted from an expanded orientation to a contracted orientation with one hand, as movement of the two wings together also effects movement of the upper and lower parts into a contracted orientation, meaning that the other hand is free to hold the watch to be inserted onto the support.

Accordingly, the invention relates to a watch support according to the preamble of Claim 1, characterized in that the upper part comprises a pair of adjustable wings that are moveable relative to the upper part between an extended disposition and a folded disposition, wherein each wing cooperates with, and ideally is operatively connected to, the lower part such that movement of the upper and lower parts into a contracted orientation effects movement of the wings into a folded disposition and movement of the two parts into an expanded orientation effects movement of the wings into an extended disposition.

Typically, the upper part is the part of the support that in use supports the body of the watch. In this regard, a top surface of the upper part comprises a substantially flat platform for support of the body of the watch.

Thus, when a user compresses the upper and lower parts together, this effects movement of the wings into a retracted disposition. This means that the user does not need to move the wings physically, as they will move automatically in response to movement of the upper and lower parts together. Likewise, when a user compresses the wings together, this effects movement of the upper and lower parts into a contracted orientation. This means that the user does not need to move the upper and lower parts, as they will move automatically in response to movement of the wings. This is an important feature as it means that the support can be contract by a user with one hand.

Suitably, each wing is pivotally connected to the upper part of the support.

Typically, the or each wing is operatively connected to the lower part by connections means (i.e. a leg) adapted to cooperate with the lower part such that movement of the lower part towards the upper part causes the or each connection means to tilt causing the or each wing to fold.

Preferably, the or each wing is operatively connected to the lower part such that movement of the or each wings from an extended disposition into a folded disposition effects movement of the two parts from an expanded orientation into a contracted orientation. This means that the support can be adjusted into a retracted orientation by movement of the or each wing into a retracted disposition.

Suitably, the lower part comprises a track adapted to receive and engage a distal end of the leg for movement along the track, whereby movement of the distal end of the leg along the track effects movement of the lower part relative to the upper part. Thus, as the leg is engaged with the track, movement of the leg along the track effects movement of the lower part relative to the upper part. This means that the support can be adjusted into a retracted orientation by movement of the wings into a folded disposition.

Ideally, each leg comprises a projection, and the track comprises a groove, in which the projection and groove are dimensioned for engagement together. Ideally, the track is curved.

Typically, the wings are hingedly connected to opposite first sides of the upper part. Preferably each wing is curved downwardly, taking the general shape of a side of a human wrist. Suitably, each wing is dimensioned such that a distal end of the wing abuts or lies adjacent to a side of the lower part when in a folded orientation. In this manner, the support is dimensioned such that in a contracted orientation, the support is similarly shaped to a human wrist.

In one embodiment, either the lower part or the upper part (preferably the lower part) of the watch support comprises at least one removable shoe. The purpose of this removable show is to facilitate an increase or decrease in the length of the support in an expanded or retracted orientation. The use of the removable shoe will be understood by comparing the support of FIGS. 1 and 2, with the support of FIGS. 8 and 9. Thus, without the shoe, the support may be used with watches suitable for children or small adults (as illustrated in FIG. 2), and with the shoe the support is more suitable for use with larger adults (as illustrated in FIG. 6). It will be appreciated that a number of removable shoes may be provided on any given watch support, in which one or more shoes may be removed to adjust the effective size of the support. Typically, the shoe is formed of a resiliently deformable material, for example a silicone material, that facilitates easy attachment and detachment of the shoe with the lower part of the support. Typically, the top of the shoe comprises a recess adapted for engagement with a base of the lower part of the support.

Suitably, the watch support is adapted to engage with a socket formed on the watch winder dimensioned for receipt of the watch support. In one embodiment, the upper part of the watch support comprises a pair of spring-actuated catches adapted to engage with corresponding formations disposed on the socket of the watch rewinder when the watch support is inserted into the socket. Typically, each catch comprises a lip that is movable from a retracted position to an extended position. Suitably, the lip is disposed adjacent or at a base of the upper part. Each catch ideally comprises an actuating button that is disposed on the upper part between the base and the top. In this way, a user can actuate the spring loaded catches using the buttons while inserting the support into the socket of the watch winder.

The invention also relates to a watch winder comprising a watch support of the invention.

The invention also relates to a display case for a wrist watch, the display case comprising a support of the invention.

The invention also relates to a kit comprising a watch winder of the invention and a computer program recorded on suitable carrier adapted for controlling the watch winder.

The invention also relates to a method of placing a watch on a watch support of the invention, the method comprising the step of moving the upper and lower parts together into a contracted orientation, whereby the wings are moved into a folded position, such that the support can fit within a watch strap, placing the support within a watch strap, and releasing the upper and lower parts such that the upper part, lower part, and wings bear against the watch/watch strap.

The invention also relates to a watch support suitable for supporting a watch in a watch rewinder, the watch support comprising upper and lower parts operatively connected for movement between an expanded and contracted orientation, and means for biasing the upper and lower parts into an expanded position, and a pair of wings mounted on either the upper or lower part and moveable between an expanded and folded orientation, and means for biasing the wings into the expanded orientation.

The invention also relates to a watch support suitable for supporting a watch in a watch rewinder, the watch support comprising upper and lower parts operatively connected for expansion and contraction along a first axis, and a pair of side parts operatively connected to the upper or lower part for expansion and contraction along a second axis different to the first axis. Typically, the first axis is a generally longtitudinal axis, and the second axis is a generally transverse axis. Preferably, the first axis is generally perpendicular to the second axis.

The invention also relates to a watch support for a watch winder that is adjustable between an expanded orientation and a contracted orientation, the support comprising a first part adapted for compression along a first axis or direction from an expanded state to a contracted state and comprising means for biasing the first part into the expanded state, and a second part adapted for expansion along a second axis or direction from an expanded state to an contracted state, in which the second part is operatively connected to the first part such that contraction of the first part effects contraction of the second part. Typically, the first axis is a generally longitudinal axis, and the second axis is a generally transverse axis. Preferably, the first axis is generally perpendicular to the second axis.

BRIEF DESCRIPTION OF THE FIGURES

The invention will be more clearly understood from the following description of some embodiments thereof, given by way of example only, with reference to the accompanying figures in which.

DETAILED DESCRIPTION OF THE INVENTION

The invention provides a watch support for watch winder, and also for other uses such as display cases for watch supports. Watch winders are devices employed to rewind automatic watches, and prevent such watches "stopping" when not in use regularly. Watch winders generally have a mechanism for gently rotating or rocking the watch, and include a removable watch support adapted to support the watch during a rewinding operation. To place a watch in a watch winder, the watch support is first removed from the watch winder, and the watch is then placed on the support, before the watch and support are placed back in the rewinder.

Known watch supports are generally two-part devices which can be contracted to facilitate placing inside a watch strap and expanded to securely grip the watch. These devices only expand along a single axis, therefore the amount of expansion or contraction that can be facilitated by any single device is limited, especially as the device should be designed for compression between a thumb and forefinger of a users hand. Thus, given these limitations, any one device is unlikely to be suitable for use with a broad range of watch sizes. The Applicant has solved this problem by providing a watch support of the afore-mentioned type, but characterized in that the upper part comprises a pair of wings that are movable relative to the upper part between an extended state and folded state. The effect of this is to provide a watch support that is adjustable along two axes (or two directions) compared with known devices that are adjustable only along a single axis. The increased flexibility of adjustments provides two main advantages: first, it increases the range of expansion and contraction of the support, thus providing a single support that may be used with watches for small and large people; and secondly, it increases the number of points where the support grips the watch both/strap from two to four, thereby providing a more secure grip on the watch.

Further flexibility is built into the watch support of the invention by providing a shoe that is adapted to engage with the lower part of the support. The shoe, when employed, effectively extends the length of the support, thereby facilitating its use with watches for larger people. Likewise, removal of the shoe facilitates use of the support with watches for smaller people.

Figure 1:
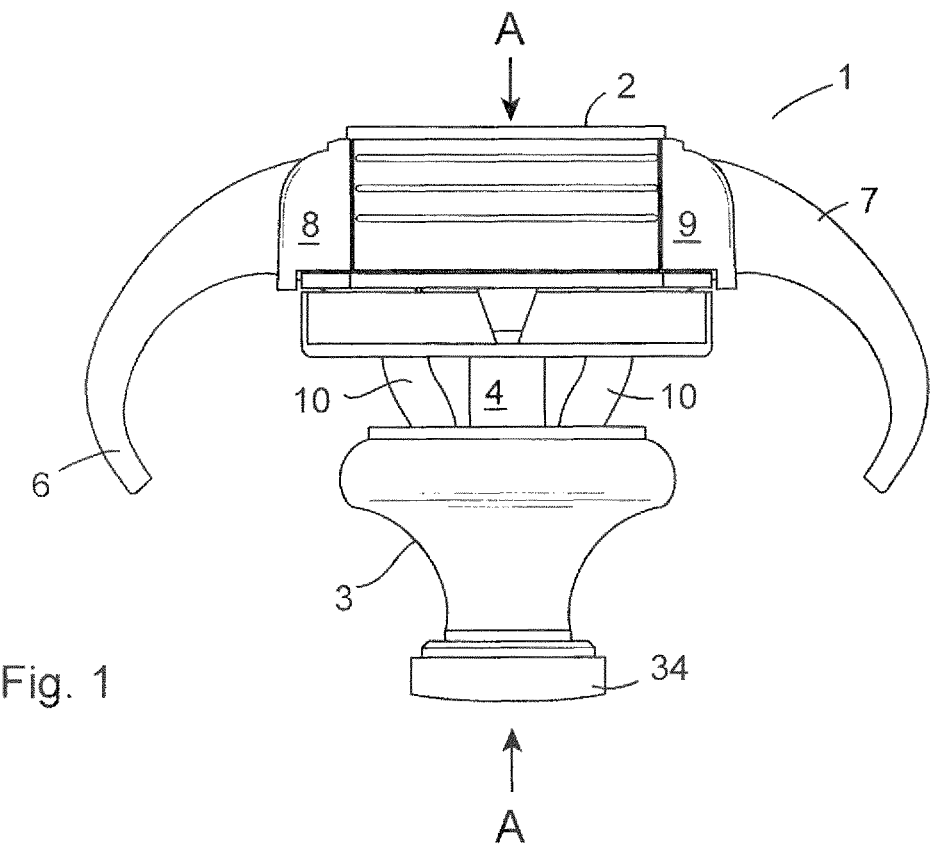
FIG. 1 is front elevational view of a watch support of the invention in an expanded orientation.
Figure 2:
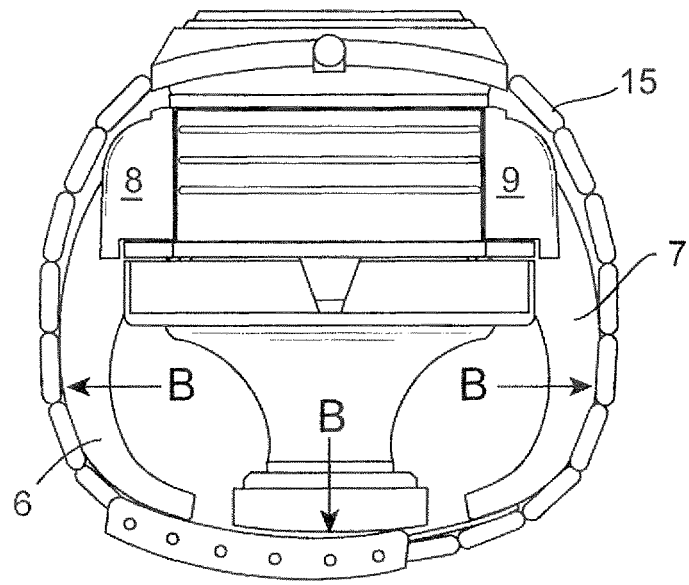
FIG. 2 is a front elevational view of a watch support of the invention in a contracted orientation gripping a watch.
Figure 3:
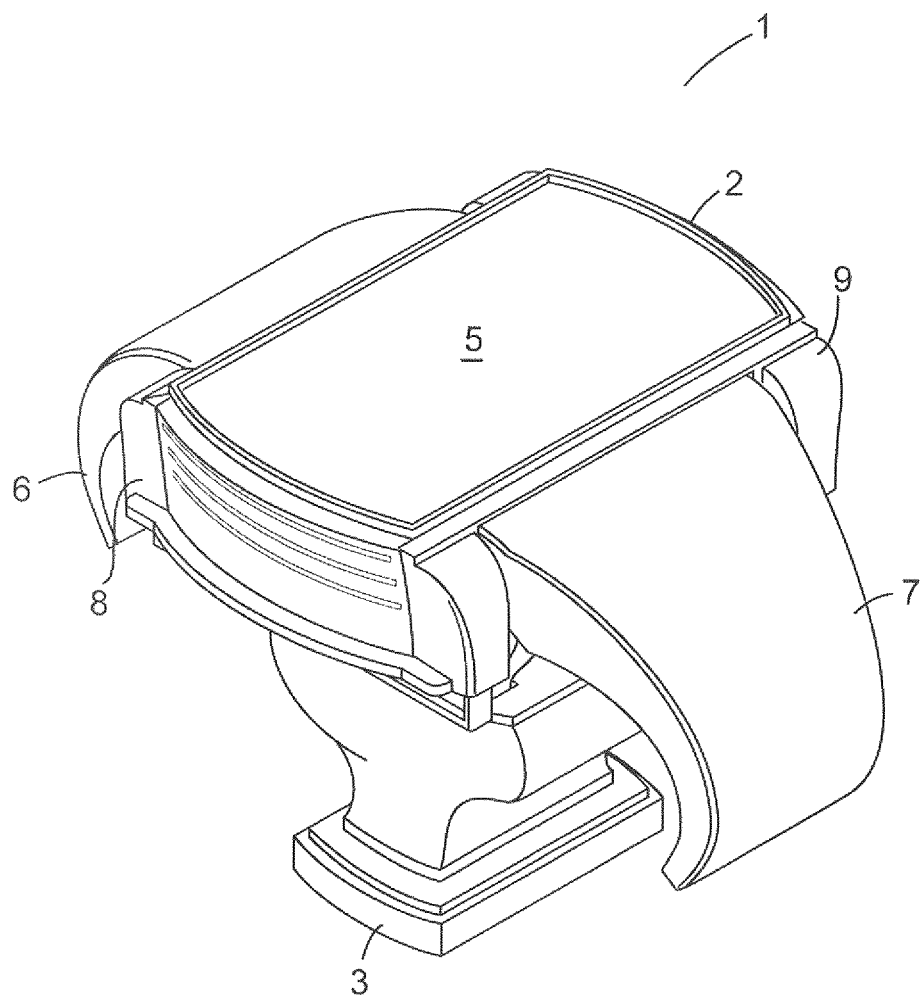
FIG. 3 is a perspective view of the watch support of FIG. 1.

Referring to the drawings, and initially to FIGS. 1 to 5, there is illustrated a watch support of the invention, indicated generally by the reference numeral 1, and comprising an upper part 2 and a lower part 3. The upper part comprises a platform 5 for supporting a body of a watch, and a downwardly depending stem 4 that is received in a socket (not shown) in the lower part 3. The upper and lower parts are movable together and apart from an expanded orientation shown in FIGS. 1 and 3 to a contracted orientation shown in FIG. 2. It will be appreciated that the two parts can be moved from any one of a number of expanded orientations into any one of a number of contracted orientations. A biasing means in the form of a helical spring (not shown) is disposed within the socket that in use biases the upper and lower parts into the expanded orientation (FIGS. 1 and 3).

Figure 4:
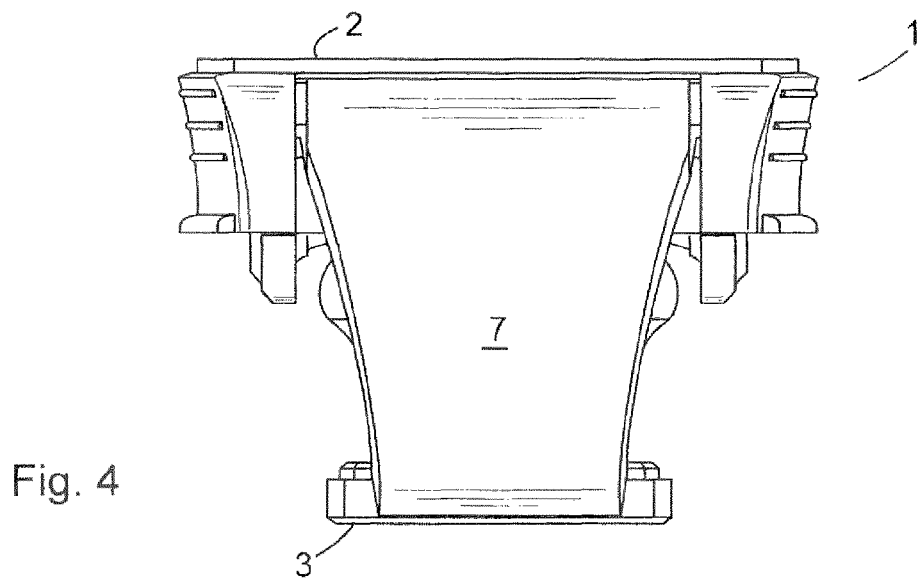
FIG. 4 is side elevational view of the watch support of FIG. 1.
Figure 5:
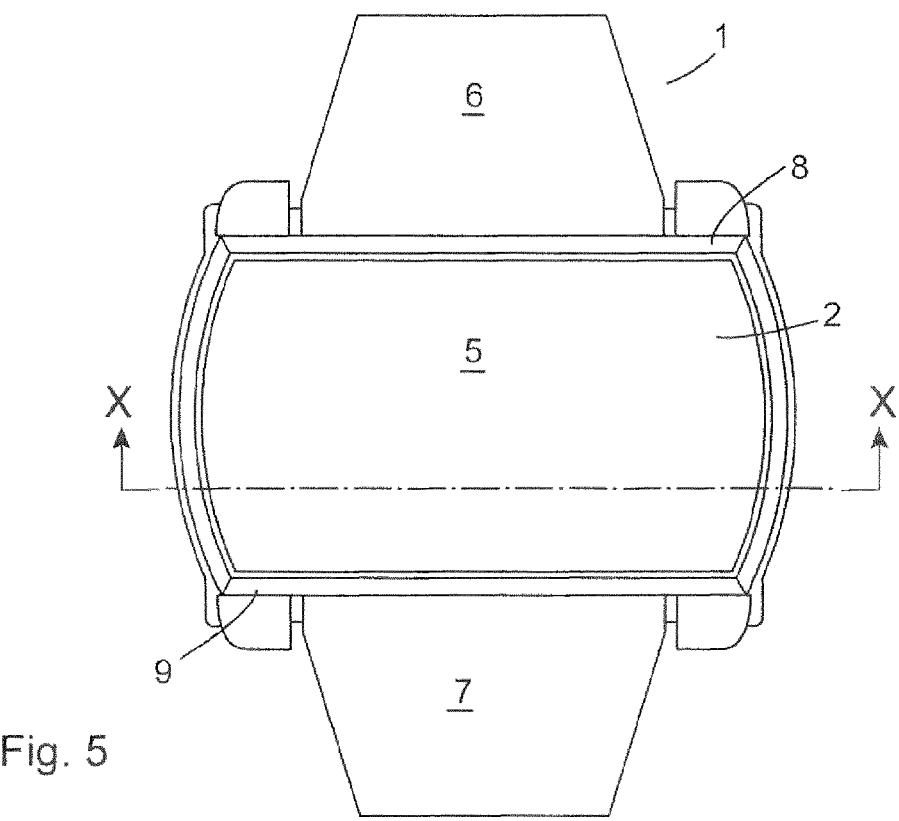
FIG. 5 is a top plan view of the watch support of FIG. 1.
Figure 6:
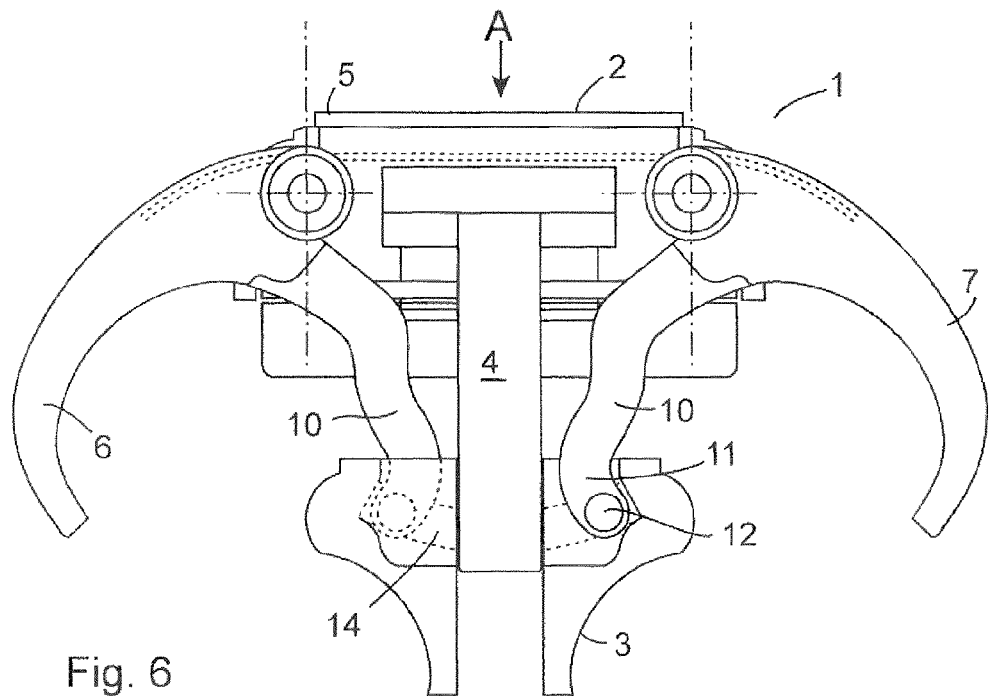
FIG. 6 is a sectional view of the watch support taken along a line X-X of FIG. 5.
Figure 7:
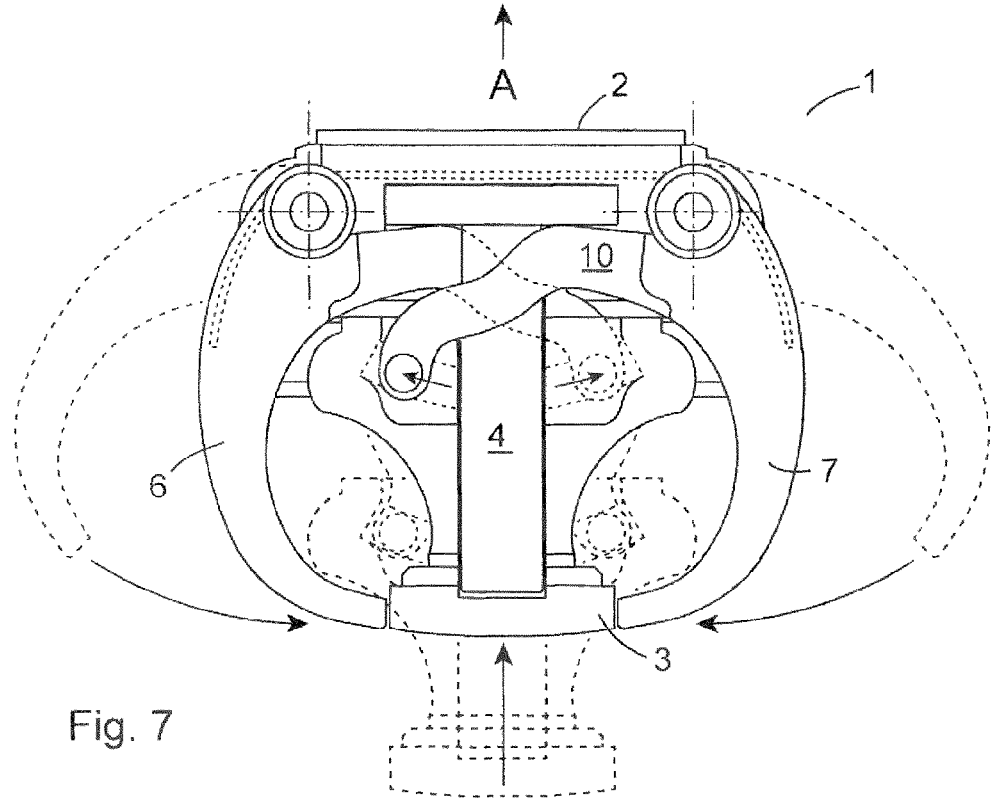
FIG. 7 is a similar sectional view to FIG. 6 but showing the support in a contracted orientation.

A pair of wings 6, 7 are hingedly connected on opposite first sides 8, 9 of the upper part 2, for movement between any number of extended positions (for example, the extended position of FIGS. 1 and 3) to any number of folded positions (for example the folded positions of FIGS. 2 and 4). Each wing is operatively connected to the lower part such that expansion and retraction of the upper and lower parts 2, 3 effects extension and retraction of the wings 6, 7. Referring to FIGS. 6 and 7 specifically, each wing 6, 7 is operatively connected to the lower part 3 by means of a downwardly depending leg 10, a distal end 11 of which cooperates with the lower part 2 such that movement of the lower part 3 relative to the upper part 2 causes the leg to tilt which in turn causes pivotal movement of the wing 6, 7. In more detail, a distal end of each leg 10 comprises a projection 12 that cooperates with a curved track 14 formed in the lower part 3; thus, when the wings are moved from an extended position into a folded position, this causes each leg 10 to tilt lifting the projection 12 upwardly and thereby lifting the lower part 2 due to the engagement between the projection and the track. In this way, movement of the wings 6, 7 from the extended position shown in FIG. 6 into a folded position shown in FIG. 7 moves the upper and lower parts into the contracted orientation. Similarly, when the upper and lower parts 2, 3 are allowed return to the expanded (resting) orientation shown in FIGS. 1 and 3 (which will occur in the resting state due to the biasing means), this causes the legs 10 to tilt in an opposite direction causing the wings 6, 7 to return to their extended position.

Referring specifically to FIGS. 1 and 2, each wing is curved downwardly, generally taking the shape of a side of a human wrist. Further, the winds are dimensioned such that when they are in the folded position, a distal end of each wing is disposed adjacent a side of the lower part. Thus, in the contracted orientation, the watch support is shaped similarly to a human wrist. This is advantageous insofar as it ensures that a watch is supported on the support in a position that is similar to when the watch is worn on a human wrist, thus preventing the watch and strap becoming warped over time.

In use, and referring initially to FIGS. 1, 6 and 7, a user applies force to the upper and lower parts along the arrows marked A in FIGS. 1 and 6 to move the support into a contracted orientation. Movement of the upper and lower parts into the contracted orientation causes the wings to move from an expanded position (FIG. 1, 6) into the folded position (FIG. 2, 7). Once contracted, the support may be inserted into a watch strap 15 as shown in FIG. 2 and released, whereby the upper and lower part and the wings will be biased outwardly, thus bearing against the watch/watch strap 15 as shown by the arrows marked B in FIG. 2. Release of the watch from the support may be effected by pressing the watch face and strap opposite the watch face together, which causes contraction of the support enabling the support to be removed from the watch.

Figure 8:
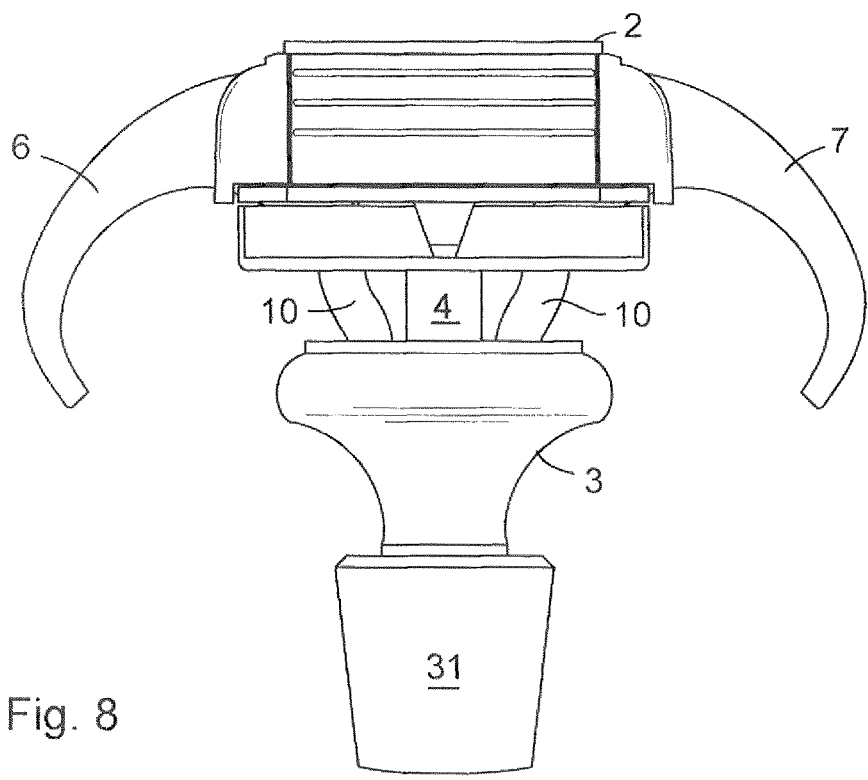
FIG. 8 is front elevational view of a watch support according to an alternative embodiment of the invention in an expanded orientation.
Figure 9:
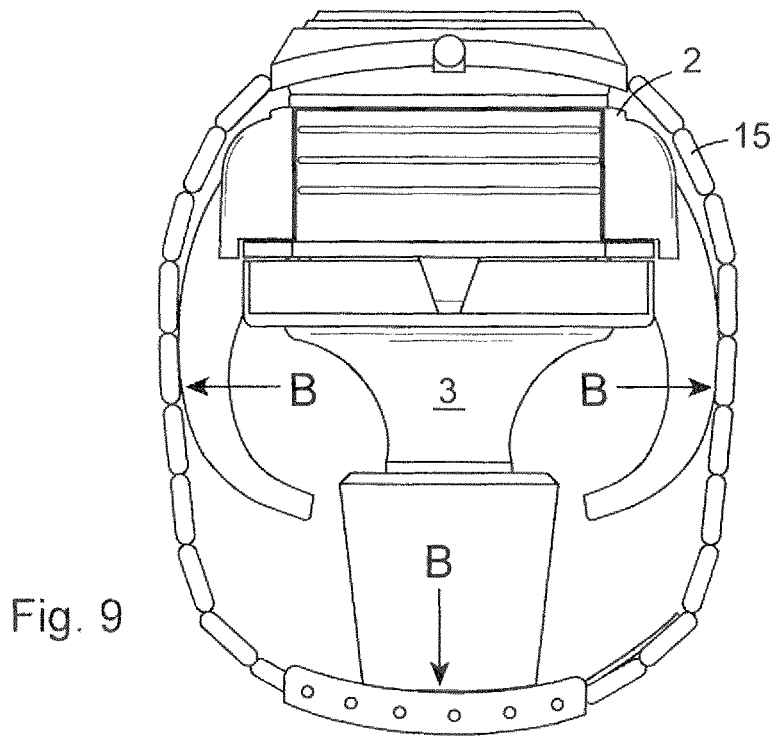
FIG. 9 is a front elevational view of the watch support of FIG. 8 in a contracted orientation gripping a watch.
Figure 10:
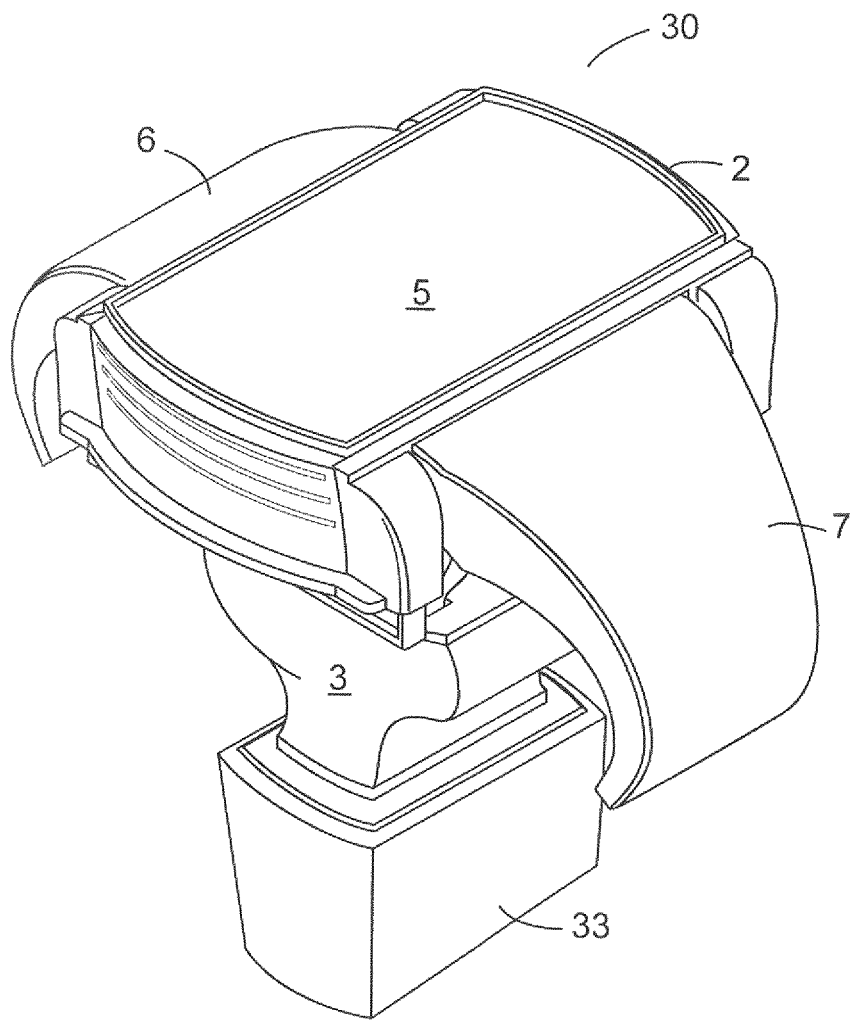
FIG. 10 is a perspective view of the watch support of FIG. 8 showing the removable shoe.
Figure 10:
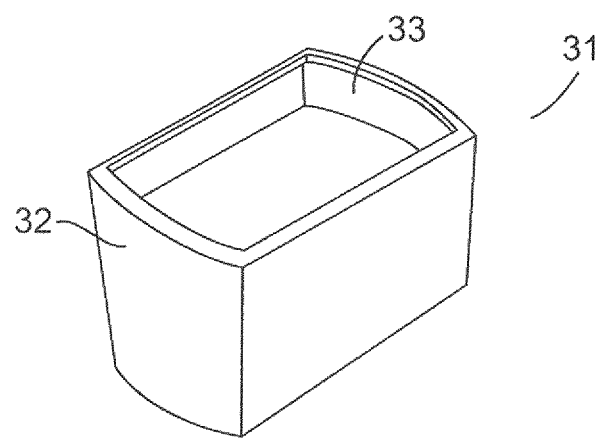
Figure 11A:
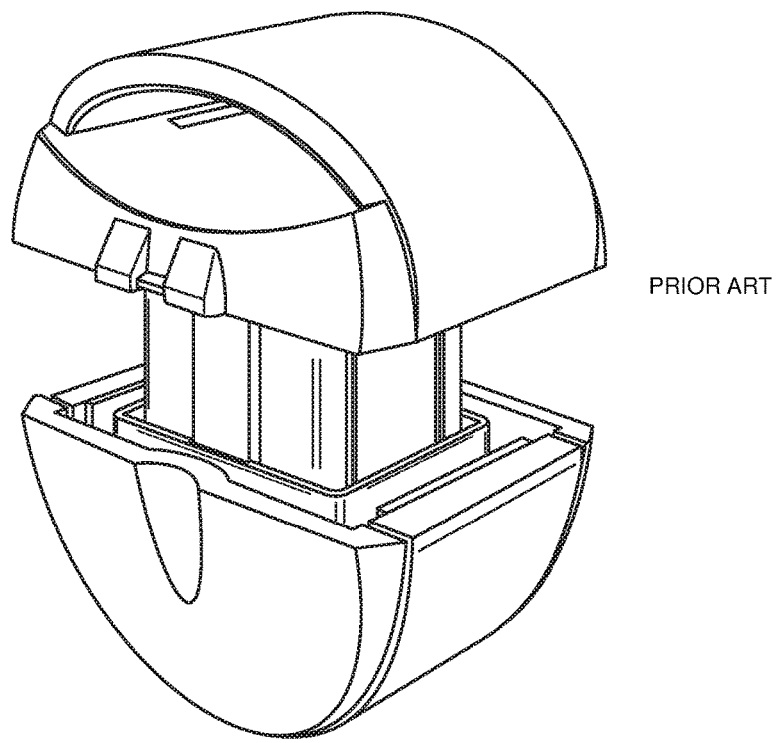
FIG. 11A (comparative) is an illustration of a known watch support for a watch winder, in which the watch support is shown in a contracted orientation.
Figure 11B:
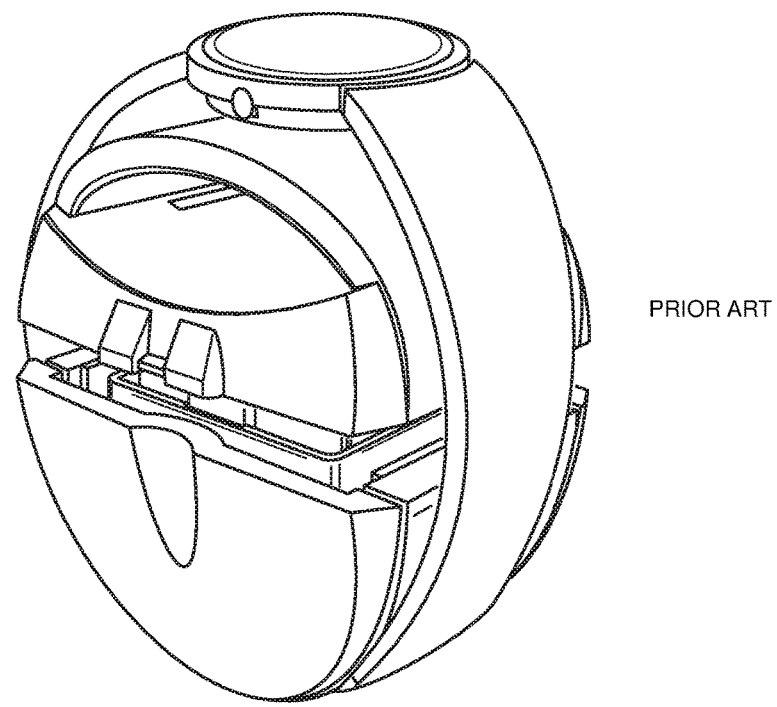
FIG. 11B (comparative) is an illustration of the watch support of FIG. 11A, in which the watch support is shown in an expanded orientation gripping a watch.

Referring to FIGS. 8 to 10 there is illustrated a watch support according to an alternative embodiment of the invention, in which parts identical to those described with reference to FIGS. 1 to 7 are assigned the same reference numerals. In this embodiment, which is generally indicated by the reference numeral 30, the lower part 3 comprises a removable shoe 31 formed of a silicone material and having a generally cuboid shape. A top 32 of the shoe 31 comprises a recess 33 dimensioned to engage with a base 34 of the lower part 3 for easy attachment and detachment of the shoe. The use of this watch support is the same as that described with reference to FIGS. 1 to 7, with the exception that the shoe may be removed to facilitate use of the support with smaller watches.

The invention is not limited to the embodiment hereinbefore described which may be varied in construction and detail without departing from the spirit of the invention.

The invention claimed is:

1. A watch support (1,30), comprising an upper part (2) operatively connected to a lower part (3) for movement between a contracted orientation and an expanded orientation, and biasing means for biasing the upper part (2) and the lower part (3) into the expanded orientation, the upper part (2) comprising a pair of adjustable wings (6, 7) that are moveable relative to the upper part (2) between an extended position and a folded position, each wing (6, 7) being operatively connected to the lower part (3) by means of a leg (10) adapted to cooperate with the lower part (3) such that
 (i) movement of the lower part (3) towards the upper part (2) into the contracted orientation effects movement of the wings (6, 7) into the folded position, (ii) movement of the upper part (2) and the lower part (3) into the expanded orientation effects movement of the wings (6, 7) into the extended position, and (iii) movement of the wings (6, 7) from the extended position into the folded position effects movement of the upper part (2) and the lower part (3) from the expanded orientation into the contracted orientation;

the lower part (3) comprising a track (14) adapted to receive and engage a distal end (11) of each leg (10) for movement along the track (14), each distal end (11) having a projection (12) dimensioned for engagement within the track (14), whereby movement of the distal end (11) of each leg (10) along the track (14) effects movement of the lower part (3) relative to the upper part (2).

2. A watch support as claimed in claim 1 in which each wing (6, 7) is curved downwardly, taking the general shape of a side of a human wrist.

3. A watch support as claimed in claim 1 in which the lower part (3) of the watch support comprises at least one removable shoe (31).

4. A watch support (1,30), comprising an upper part (2) operatively connected to a lower part (3) for movement between a contracted orientation and an expanded orientation, and biasing means for biasing the upper part (2) and the lower part (3) into the expanded orientation, the upper part (2) comprising a pair of adjustable wings (6, 7) that are moveable relative to the upper part (2) between an extended position and a folded position, each wing (6, 7) being operatively connected to the lower part (3) by means of a leg (10) adapted to cooperate with the lower part (3) such that (i) movement of the lower part (3) towards the upper part (2) into the contracted orientation effects movement of the wings (6, 7) into the folded position, (ii) movement of the upper part (2) and the lower part (3) into the expanded orientation effects movement of the wings (6, 7) into the extended position, and (iii) movement of the wings (6, 7) from the extended position into the folded position effects movement of the upper part (2) and the lower part (3) from the expanded orientation into the contracted orientation;

the lower part (3) comprising a track (14) adapted to receive and engage a distal end (11) of each leg (10) for movement along the track (14), the track (14) being curved, whereby movement of the distal end (11) of each leg (10) along the track effects movement of the lower part (3) relative to the upper part (2).

5. A watch support as claimed in claim 4 in which each wing (6, 7) is curved downwardly, taking the general shape of a side of a human wrist.

6. A watch support as claimed in claim 4 in which the lower part (3) of the watch support comprises at least one removable shoe (31).

* * * * *